United States Patent [19]

Crites

[11] 4,077,190
[45] Mar. 7, 1978

[54] GRASS TRIMMER

[76] Inventor: Edmond W. Crites, 5618 Oliva St., Lakewood, Calif. 90714

[21] Appl. No.: 679,884

[22] Filed: Apr. 26, 1976

[51] Int. Cl.² .......................................... A01D 35/24
[52] U.S. Cl. .................................... 56/12.7; 56/15.9; 56/504
[58] Field of Search ............... 56/12.7, 504, 505, 294, 56/15.9

[56] References Cited

U.S. PATENT DOCUMENTS

| | | | |
|---|---|---|---|
| 2,501,925 | 3/1950 | Yensen et al. | 56/12.7 |
| 2,663,137 | 12/1953 | Asbury | 56/12.7 X |
| 3,826,068 | 8/1974 | Ballas et al. | 56/12.7 |
| 3,884,019 | 5/1975 | Gerzanich | 56/12.7 |

FOREIGN PATENT DOCUMENTS

| | | | |
|---|---|---|---|
| 160,385 | 5/1955 | Australia | 56/12.7 |
| 474,244 | 6/1951 | Canada | 56/12.7 |

Primary Examiner—Jay N. Eskovitz
Attorney, Agent, or Firm—Fulwider, Patton, Rieber, Lee & Utecht

[57] ABSTRACT

There is disclosed a memorial marker trimmer including a horizontal rotary drum mounted from a supporting vehicle and rotated about a horizontal axis. Mounted at equidistance about the periphery of the drum are four axially extending rows of leather thongs forming whips about eleven inches long and a quarter-inch square in cross section. Consequently, when the rotor is driven at high r.p.m.'s, the thongs will whip radially outwardly in vertical planes with the free extremities thereof engaging the grass to be trimmed during their downward sweep and breaking the top portions of the individual grass blades from the stalks thereof, as well as mulching the cuttings and sweeping clean obstacles over which the drum is passed.

14 Claims, 5 Drawing Figures

GRASS TRIMMER

BACKGROUND OF THE INVENTION

1. Field of the Invention

The present invention relates generally to grass trimmers and more particularly to a grass trimmers for trimming about memorial markers.

2. Description of the Prior Art

Numerous different types of bladed grass trimmers have been proposed, but such trimmers are generally rather dangerous to operate and require laborious and painstaking work in order to trim edges around concrete sidewalks, headstones and the like. There have been proposed rotary trimmers which incorporate flexible whips that are spun in a plane perpendicular to the grass blades to sever such blades from their roots. These trimmers, while being somewhat safer to employ, are still quite time-consuming, making their use impractical in trimming large lawns, cemeteries or the like having numerous different ornaments, obstacles and memorials arranged thereabout.

SUMMARY OF THE INVENTION

The grass trimmer of the present invention is characterized by a horizontal rotary drum having longitudinally extending rows of flexible whips affixed to the side thereof and projecting therefrom to form flexible free ends which upon rotation of the drum are spun radially outwardly in vertical planes to whip against the grass to be trimmed and sever the tops of the blades thereof from their lower stalks.

DESCRIPTION OF THE PREFERRED EMBODIMENT

Figure 1:
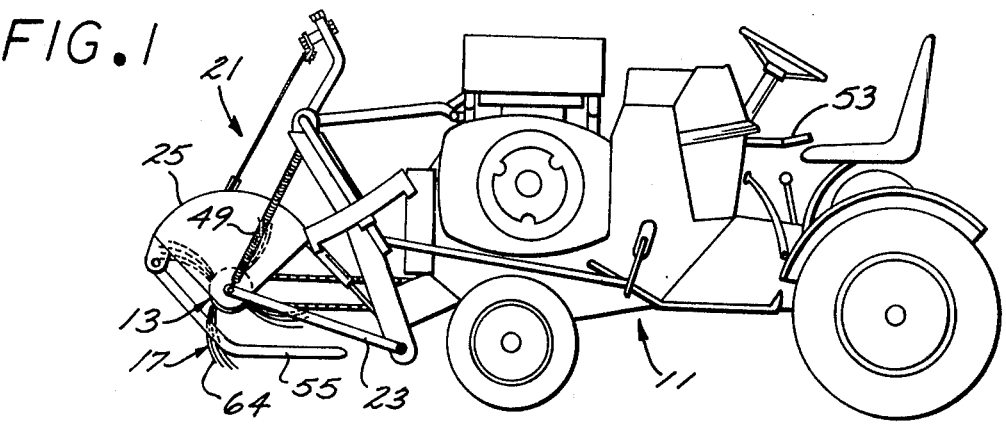
FIG. 1 is a side elevational view of a grass trimmer embodying the present invention.
Figure 2:
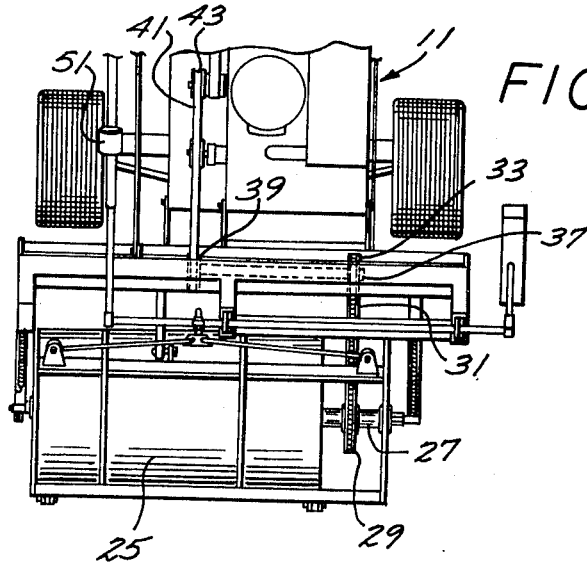
FIG. 2 is a partial top view, in enlarged scale, of the grass trimmer shown in FIG. 1.

The grass trimmer of the present invention may be mounted on any desired support carriage, such as a tractor 11, and includes, generally, a horizontal rotary drum 13 (FIGS. 3 and 4) having secured to the opposite sides thereof longitudinally extending rows of whips formed by leather thongs, generally designated 17, which are about 1⅛ inches square and about 11 inches long, to have their free ends form sweep extremities whereby rotation of the drum will cause the free extremities of such whips to be flung radially outwardly in respective vertical planes to whip the respective ends thereof against the grass to be trimmed, thereby severing the tops of the grass blades from the stalks thereof and sweeping the grass in the direction of movement of the tractor 11, thereby further mulching and pulverizing the severed grass stalks and sweeping a memorial headstone 67 clean.

Large cemeteries may have a thousand or more headstones which protrude an inch or so above ground, thus requiring laborious and tedious trimming about each such headstone in order to give the cemetery itself a well-manicured appearance. Additionally, such trimming with trimmers employing sharp knives and the like is extremely dangerous and frequently results in damage to the trimmer itself.

The grass trimmer of the present invention is intended to overcome these shortcomings and employs a suspension frame, generally designated 21, and including a support arm 23 pivotally connected at its rear extremity to the tractor frame and carrying at its forward extremity a semicircular, downwardly opening hood 25 having mounted thereunder the rotary drum 13.

Such drum is mounted on a horizontal shaft 27 having a chain sprocket 29 non-rotatably secured thereto. The chain sprocket 29 is driven by a chain 31 which is fed over a sprocket 33 mounted non-rotatably on a shaft 37 having a driven belt pulley 39 on the opposite extremity thereof, the belt pulley 39 being driven by a belt 41 which is itself driven by a drive pulley 43 coupled to the tractor motor.

The hood 25 is biased upwardly by means of coil tension springs 49 and the suspension frame itself is counterweighted by means of a counterweight 51. A control handle 53 is coupled with such suspension frame 25 for raising and lowering of the suspension frame 21 itself.

Referring to FIG. 1, a plurality of downwardly and rearwardly extending skids 55 are connected to the front extremity of the hood 25 and are themselves adjustable to various heights for carrying the rotary drum 13 spaced at various levels off the ground.

Figure 4:
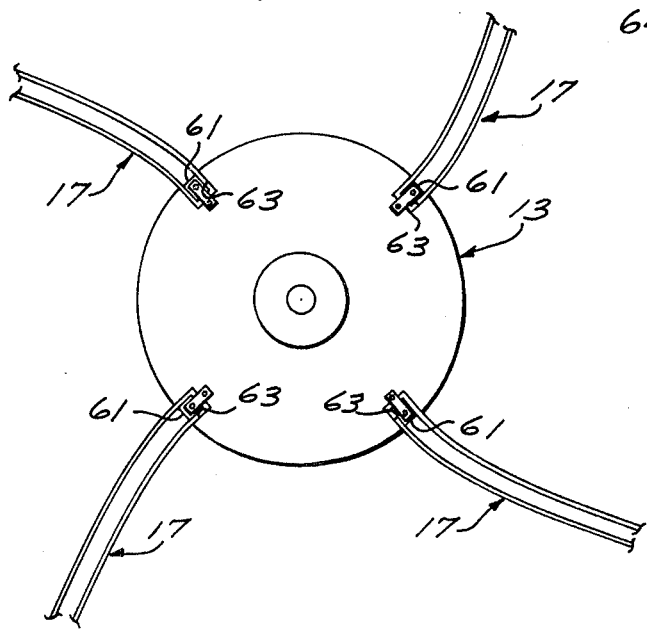
FIG. 4 is an end view, in enlarged scale, of a rotary drum incorporated in the grass trimmer shown in FIG. 1.
Figure 5:
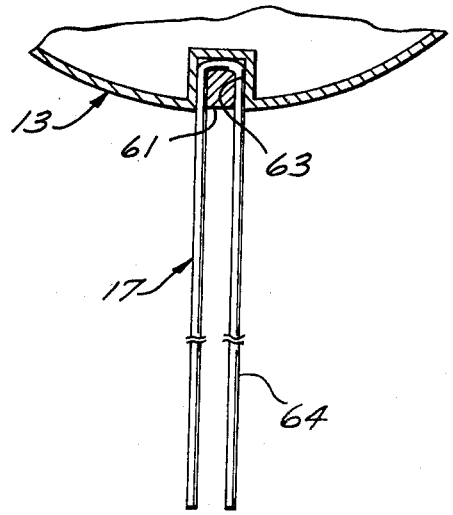
FIG. 5 is a partial transverse sectional view, in enlarged scale, taken along the line 5—5 of FIG. 3.

Referring to FIGS. 4 and 5, the leather thongs 17 are conveniently cut to a length of 22 inches and are looped medially over longitudinal retaining bars 61 which are received in channels 63 formed in the drum 13 to thus hold the medial section of such thongs 17 captive on the drum while leaving the opposite extremities thereof free to whip against the grass being trimmed. It is important that the whip thongs 17 are of sufficient length to terminate at their radially outer extremities to form soft sweep extremities 64 which provide sufficient centrifugal momentum to cause the engagement thereof with grass around the periphery of the marker to pull such grass free from its roots while presenting sufficient softness to avoid damage to the marker upon contact therewith.

In operation, the skids 55 are preferably adjusted to allow only the last ½ inch of the free extremities of the whips 17 to engage the ground over which the trimmer passes. In this regard, it is important that the whips 17 have sufficient length to provide the necessary flexibility for trimming of the grass and to enable the rotary drum 13 to be carried at a sufficient height to conveniently pass over obstacles about which the grass is to be trimmed. It has been found that whips 17 shorter than 2 inches in length do not operate satisfactorily and for leather whips the cross section thereof should be sufficient to provide relatively long life and preferably about ¼ inch in one transverse direction and no less than ⅛ inch square.

The handle 53 may be retracted to raise the skids off the ground until such time as the obstacles about which the grass to be trimmed is reached. Rotation of the drum 13 is then initiated and handle 53 then actuated to lower the suspension frame 21 to allow the skids 55 to ride on the ground and maintain the rotary drum at the desired height.

Figure 3:
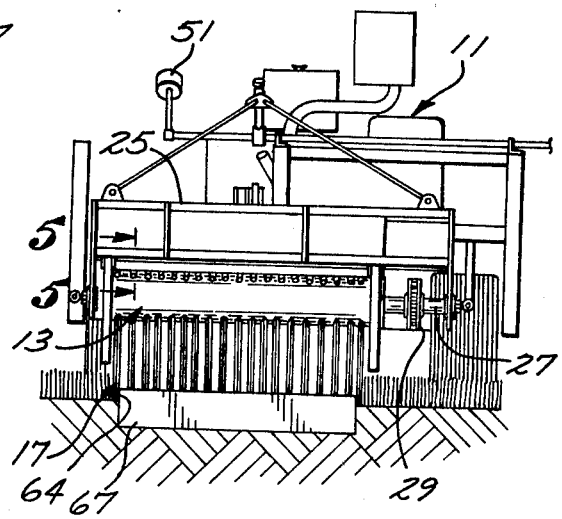
FIG. 3 is a front view, in enlarged scale, of the grass trimmer shown in FIG. 1.

In the particular embodiment shown, the trimmer is intended to trim the grass around markers 67 which are normally about 20 inches in length, so the drum 13 itself is 20 inches long. As the drum 13 approaches the headstone from one side thereof, the free extremities of the whips 17 throughout the length of the drum will engage the grass along such side to beat and frictionally pull such blades from their stalks, thus trimming such grass along the side of the headstone. As such drum is passed over the headstone 67 sweep extremities 64 of the the whips 17 at the medial portion thereof slap against the top of such headstone extremities of the and the whips at the opposite ends of such drum flare horizontally outwardly as shown in FIG. 3 to trim the grass along the opposite ends of such headstone. Preferably, the drum 13 is rotated clockwise as viewed in FIG. 1 to draw the cuttings along in the direction of travel and mulch such cuttings and also sweep the top surface of the headstone 67 clean. When the drum 13 clears the far side of the headstone 67 the medial whips 17 will have their free extremities frictionally engaged against the grass blades to draw and beat such blades from their stalks to trim along such far side.

It has been found that the drum should be rotated at least 1000 r.p.m. and preferably about 10,000 r.p.m. to obtain the desired cutting and mulching action.

After the headstone 67 has been cleared, the handle 53 may again be retracted to raise the suspension frame 21 so the tractor 11 rapidly advance to the next headstone about which the grass is to be trimmed and the workman can continue his rounds.

From the foregoing, it will be apparent that the grass trimmer of the present invention provides an economical and convenient means for trimming grass about obstacles without danger to the operator or damage to the trimming equipment itself. The grass is trimmed close to the obstacle and the cuttings mulched to a fine and nearly indetectable mulching.

Various modifications and changes may be made with regard to the foregoing detailed description without departing from the spirit of the invention.

I claim:

1. A combination memorial marker trimmer and polisher for trimming grass on opposite sides of headstones of a predetermined width and comprising:
   a tractor;
   an operator's support on said tractor;
   a rotor suspension frame;
   support means for supporting said frame on the front of said tractor at a predetermined level above ground;
   a horizontally elongated rotor mounted from said frame for rotation about a horizontal axis;
   mounting means mounting said frame from said tractor for raising and lowering of said rotor;
   a handle coupled with said lifting means and accessible from said operator's support for raising and lowering said rotor;
   a prime mover for driving said tractor and coupled with said rotor for rotation thereof; and
   a plurality of elongated leather flexible whips mounted on said rotor in longitudinally spaced apart relationship throughout a horizontal length substantially as long as the width of said headstone, having a cross sectional dimension no greater than 1/4 inch and no less than 1/8 inch in any direction and projecting radially outwardly therefrom a distance sufficient to form free sweep extremities for engaging said grass with said rotor supported at said predetermined level above the ground whereby rotation of said rotor will cause said free extremities of said whips to whip radially outwardly and said tractor may be driven over said headstones to dispose said rotor centrally thereover, said handle grasped by an operator on said support and manipulated to lower said rotor to flail said grass and sever it from its root and cause sweep extremities disposed medially on said rotor to contact the top surface of said headstone and sweep it clean.

2. A memorial marker trimmer according to claim 1 wherein:
   said whips are substantially 1/4 inch square.

3. A memorial marker trimmer according to claim 1 wherein:
   said whips are substantially 11 inches long.

4. A memorial marker trimmer according to claim 1 wherein:
   said whips are constructed of leather thongs.

5. A memorial marker trimmer according to claim 1 wherein:
   said whips are at least 2 inches long.

6. A memorial marker trimmer according to claim 1 that includes:
   a plurality of rows of said whips mounted on opposite sides of said rotor.

7. A memorial marker trimmer according to claim 1 wherein:
   said support means includes means adjustable to support said rotor at different heights.

8. A memorial marker trimmer according to claim 1 wherein:
   said whips are constructed of leather substantially 11 inches long.

9. A memorial marker trimmer according to claim 1 wherein:
   said whips are constructed of leather substantially 1/4 inch square-in-cross section.

10. A memorial marker trimmer according to claim 1 wherein:
    said whips are spaced along said rotor at 1/8 inch intervals.

11. A memorial marker trimmer according to claim 1 wherein:
    said whips are constructed of leather thongs substantially 1 1/8 inch square by 11 inches long.

12. A memorial marker trimmer according to claim 1 that includes:
    a hood projecting longitudinally over the upper side of said rotor and spaced therefrom for passage of said sweep extremities as they pass thereunder during their rotary travel.

13. A memorial headstone trimmer and polisher of the type including a tractor, a horizontally elongated rotor, mounting means for mounting said rotor from said tractor for rotation about a horizontal axis, a prime mover for driving said tractor and coupled with said rotor for rotation thereof, support means carrying said rotor a selected distance above said headstone, the improvement comprising:
    a plurality of elongated flexible leather whips mounted on said rotor in longitudinally spaced apart relationship and projecting radially outwardly therefrom to form free soft sweep extremities having cross sectional dimensions no greater than 1 1/8 inch and no less than 1/8 inch whereby said prime mover may transport said rotor over said headstone with one end thereof carried in vertical alignment over one side thereof to cause the sweep extremities mounted medially on said rotor to engage said headstone and polish same while those over said one side will engage the grass and stalks adjacent said headstone and break said stalks from their roots and/or uproot said stalks.

14. The memorial headstone trimmer and polisher set forth in claim 13, wherein:

said sweep extremities have cross sectional dimensions no greater than ¼ inch.

* * * * *